United States Patent [19]

Morcom

[11] 4,033,066

[45] July 5, 1977

[54] FISHING TACKLE BOX

[76] Inventor: Paul J. Morcom, Rte. No. 1, Box 235, Henderson, Tex. 75652

[22] Filed: July 18, 1975

[21] Appl. No.: 597,216

[52] U.S. Cl. .......................................... 43/54.5 R
[51] Int. Cl.[2] ....................................... A01K 97/04
[58] Field of Search .......... 43/54.5, 57.5; 312/272, 312/272.5, 283, 285, 286, 289, 295, 306; 211/43, 126, 134; 108/96, 107

[56] References Cited

UNITED STATES PATENTS

| | | | |
|---|---|---|---|
| 2,697,961 | 12/1954 | Casselman et al. | 312/306 |
| 3,005,671 | 10/1961 | Majeski | 43/54.5 R |
| 3,052,363 | 9/1962 | Foote, Jr. et al. | 312/287 |
| 3,481,066 | 12/1969 | Woolworth | 43/57.5 R |

Primary Examiner—Warner H. Camp
Attorney, Agent, or Firm—Richards, Harris & Medlock

[57] ABSTRACT

A fishing tackle box particularly adapted for storing plastic fishing worms. The tackle box includes an outer housing having two opposed open sides. A plurality of open top horizontal trays, are mounted within the housing in a stacked configuration. The trays are mounted for vertical movement within the housing and have compartments therein for storing fishing tackle such as fishing worms and the like. Each of the trays includes structure for maintaining the tray in any of a plurality of vertical positions within the housing. The trays may then be selectively positioned vertically in the housing to allow access to the compartments in the trays through the open sides of the housing.

22 Claims, 10 Drawing Figures

FISHING TACKLE BOX

FIELD OF THE INVENTION

This invention relates to fishing tackle storage, and more particularly relates to a tackle box particularly useful for storing plastic fishing worms.

THE PRIOR ART

A wide variety of fishing tackle boxes have been heretofore developed for storing fishing tackle such as hooks, lines and artificial bait. The majority of such fishing tackle boxes have included lids which must be pivoted upwardly and outwardly, thereby taking up a considerable amount of space and often resulting in an unstable, top-heavy structure. Such boxes have often thus tended to tip over when opened, thereby spilling the tackle contents. In addition, such prior tackle boxes have not been designed to accommodate elongated objects such as plastic fishing worms, and the fishing worms have been required to be folded or intermixed in a pile, thereby making it difficult to select the desired worm and causing undesirable bending of the lures. Many fishing tackle boxes have also not been suitable for storage of fishing worms, due to the fact that liquid sprayed on the worms tends to accumulate in the closed boxes and cause deterioration.

A need has thus arisen for a fishing tackle box particularly useful for storing elongated plastic fishing worms, as well as other fishing tackle. The fishing tackle box should have drainage for allowing drainage of liquid applied to the fishing worms. The tackle box should be able to be maintained in a secure manner so as to prevent the dislodging of the worms from their storage places. The tackle box should accommodate a large number of worms and other fishing tackle, and yet be constructed so that each worm may be easily available for selection when desired.

SUMMARY OF THE INVENTION

In accordance with the present invention, a tackle box includes an outer housing. A plurality of open topped trays are mounted within the housing for vertical movement within the housing. Each of the trays includes compartments for receiving tackle devices. Structure is provided on the trays for maintaining the trays in any of a plurality of vertical positions in the housing to allow selective access to each of the trays.

In accordance with another aspect of the invention, a fishing tackle box includes an outer housing having at least one open side. A plurality of open topped horizontal trays are mounted within the housing for vertical movement within the housing. Each of the trays includes compartments for storing fishing tackle. Structure is provided on the trays for maintaining the trays in any of a plurality of vertical positions in the housing, wherein the trays may be selectively positioned vertically in the housing to allow access to the compartments through the open side of the housing.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
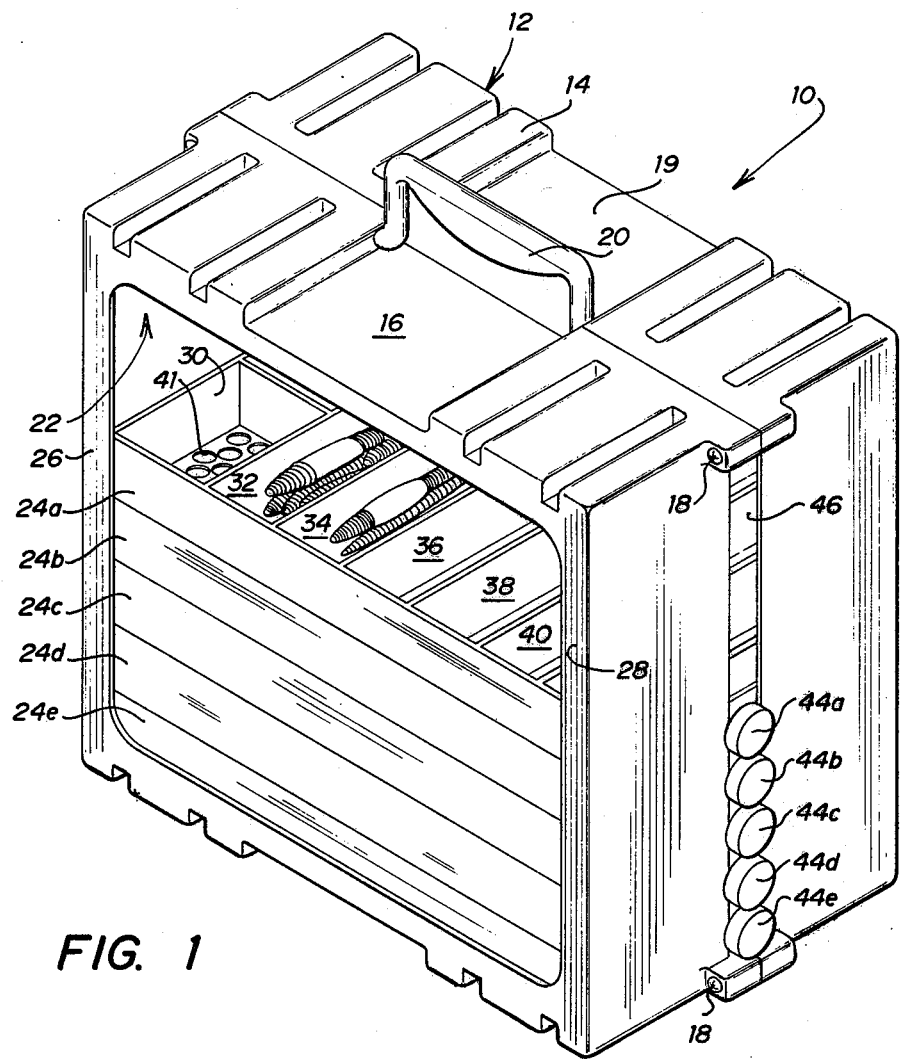
FIG. 1 is a perspective view of the preferred embodiment of the present tackle box, with the top tray positioned for access thereto.

FIG. 1 is a perspective view of the preferred embodiment of the tackle box in accordance with the invention. The tackle box is designated generally by the numeral 10 and includes a rigid outer housing 12 preferably comprised of lightweight plastic and formed from two identical housing portions 14 and 16 which are connected together by bolts 18. A recess 19 is formed across the top middle portion of the housing 12 and a handle 20 is pivotally mounted therein. If desired, the handle 20 may be moved horizontally to fit within the recess 19 to make a more compact unit.

A generally rectangular side opening 22 is formed in one side of the housing 12. An identical opening is formed in the opposite side of the housing 12, although in some embodiments, it may be desirable to enclose the opposite side of the housing 12. A plurality of horizontal trays 24a–e are mounted in a stacked configuration within the housing 12. The lengths of the trays 24a–e are longer than the length of the side opening 22, and housing flanges 26 and 28 prevent removal of the trays through the side opening 22. Each of the trays 24a–e are identical, and include compartments 30, 32, 34, 36, 38 and 40 therein. Each of the compartments includes apertures 41 formed in the bottom thereof to allow fluid drainage.

While five trays have been illustrated, in the preferred embodiment, it will be understood that more or less trays may be used in the preferred embodiment.

It will also be understood that the compartments 30–40 may be provided with varying dimensions to hold different types of fishing tackle. However, in the preferred embodiment of the invention, the majority of the compartments 30–40 will be elongated and will extend substantially the width of the housing 12, in order to accommodate the full length of plastic fishing worms. Although the majority of the compartments 30–40 are shown empty for clarity of illustration, compartments 32 and 34 are filled with plastic fishing worms in the manner illustrated.

Figure 2:
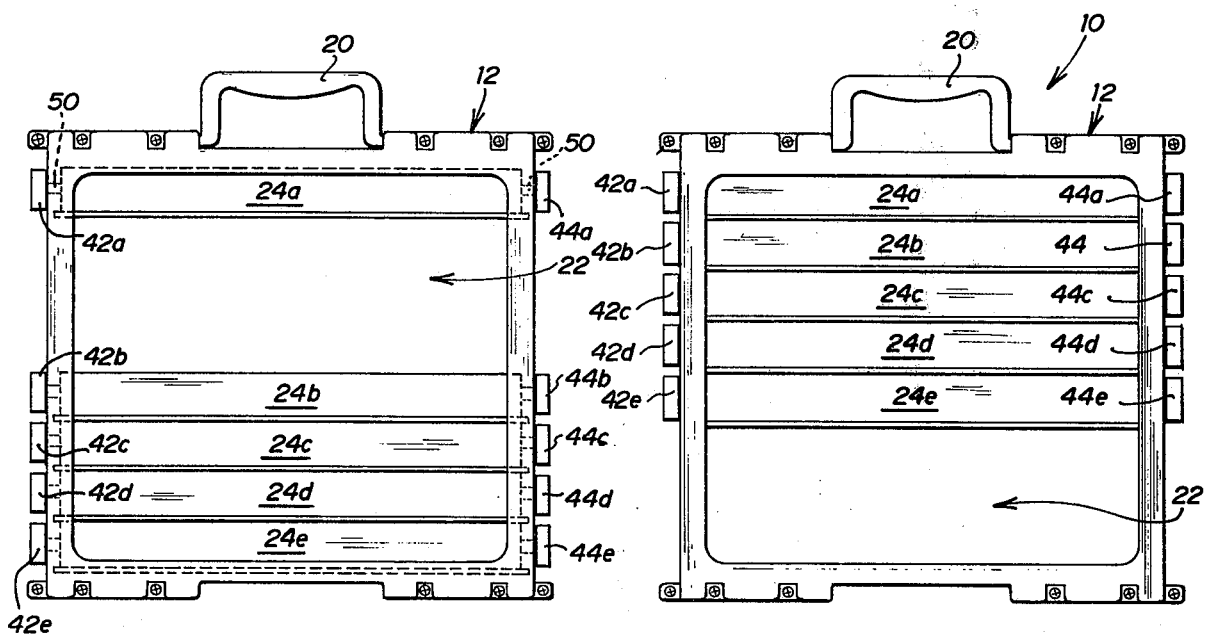
FIG. 2 is a side view of the tackle box shown in FIG. 1, with the top tray mounted in the upward position.

An important aspect of the present invention is the provision of knobs 42a–e, shown in FIG. 2, on the ends of each of the trays 24a–e. The knobs 44a–e are operable to move vertically along a vertical slot 46 formed in one end of the housing 12. A similar slot, not shown, is formed in the opposite end of the housing 12 to accommodate knobs 42a–e in the identical manner.

Each of the knobs 42a–e and 44a–e include a shaft 50 (FIG. 2) which extends through slot 46 and which is threadedly received within a threaded opening in the end of each respective tray. When both knobs on the end of a tray are unscrewed and therefore loosened, the tray may be vertically moved within the housing 12 to any desired location. Thereafter, if the knobs 42a and 44a are rotated to be tightened toward the tray, the inner surfaces of the knobs abut against the side walls of the housing 12 and hold the tray in the desired position.

As shown in FIG. 1, all five trays 24a–e have been moved to their lower-most position, such that only the compartments in tray 24a are accessible through the side opening 22. Referring to FIG. 2, the tray 24a has been moved to its upper-most position, such that the contents thereof are inaccessible and are securely contained. The remaining four trays 24b–e are in their lower-most position. In this position, the contents of tray 24b are accessible through the side opening 22. The contents of trays 24a and 24c–e are not accessible and are securely retained therein. In a similar manner, the contents of each of the trays may be accessible by moving the tray immediately above to its upper-most position. As shown in FIG. 2, tray 24a was moved to its upper-most position by unscrewing the knobs 42a and 44a, moving the tray 24a to the illustrated position, and by tightening the screws 42a and 44a to maintain the tray 24a in the desired position.

Figure 3:
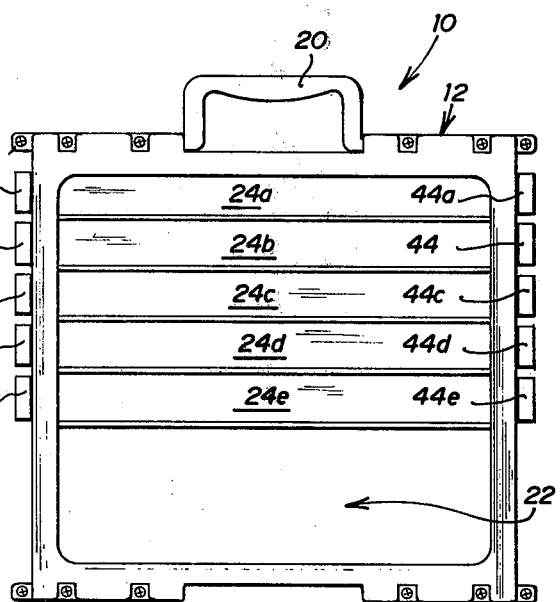
FIG. 3 is a side view of the tackle box shown in FIG. 2 with all trays mounted in the upward position for storage.

FIG. 3 illustrates all of the trays 24a–e as having been moved to the upper-most position. In this position, the contents of none of the tray are accessible through the side opening 22, and thus in this position the fishing tackle box 10 is fastened for storage. Even if the housing 12 is tipped over in the illustrated position, none of the contents of the trays will be spilled out. Another important aspect of the invention is that in the closed position shown in FIG. 3, a space exists between the bottom of the housing 12 and the bottom of the lower-most tray 24e. Thus, in case the tackle box is being used in a boat, water may wash through the bottom of the housing 12 without contacting the contents of the trays 24a–e.

Figure 4:
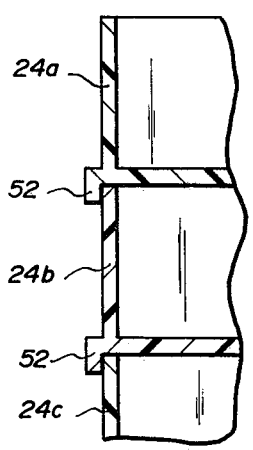
FIG. 4 is a partially broken away view of vertically stacked trays in accordance with the invention.

FIG. 4 illustrates a partially broken away sectional view of ends of trays 24a–c. Flanges 52 hang downwardly from each tray and overhang the edges of the tray immediately therebelow. The contents of the trays may thus be waterproof in this embodiment. When apertures 41 such as shown in FIG. 1 are utilized, the liquid for conditioning fishing worms may be applied directly to the worms, and the liquid will flow through the apertures and on through the trays below and eventually out of the housing.

Figure 5:
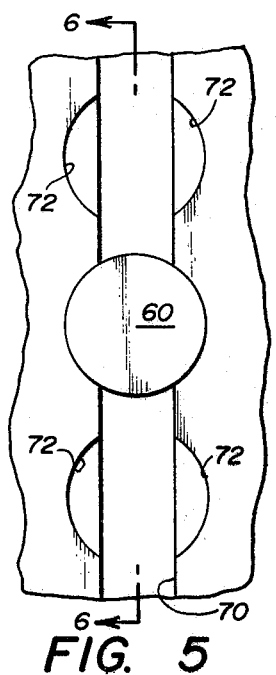
FIG. 5 is a front view of a second embodiment of the positioning knob for use with the tackle box shown in FIG. 1.
Figure 6:
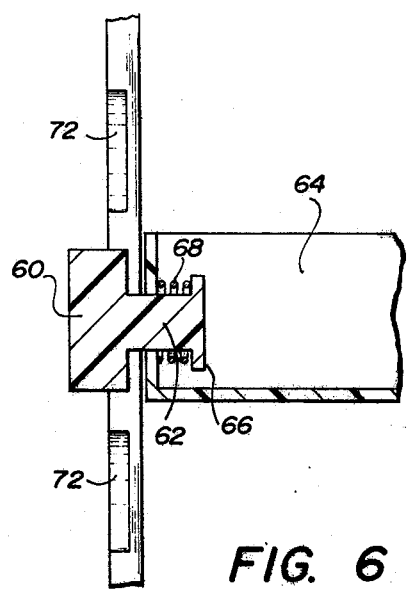
FIG. 6 is a sectional view of the knob arrangement shown in FIG. 5 taken generally along the section lines 6—6.

It will be understood that other techniques may be utilized to suppport the trays in the desired vertical position. FIGS. 5 and 6 illustrate a second embodiment of the vertical support system for the embodiment shown in FIG. 1. In this embodiment, knobs 60 include shafts 62 which slidably extend through the ends of a tray 64. A flange 66 prevents the shaft 62 from being completely withdrawn from the tray 64. A spring 68 spring biases the knob 60 toward the tray 64. Manual force must be exerted to pull the knob 60 against the force of the spring outwardly from a tray 64.

In the manner of the structure shown in FIGS. 1–3, a slot 70 is formed in the end of the outer rigid housing of the device. In this embodiment, circular counterbore portions 72 are formed at spaced locations along the length of the slot 70. The counterbores are configured to receive the knobs 60 to lock the knobs 60 in place. When it is desired to move tray 64 to an upper or lower position from that shown in FIG. 6, the knob 60 is manually pulled outwardly from engagement with a counterbore 72. The tray 64 is then moved to a different vertical position and the knob 60 is released. The spring 68 pulls the knob 60 into the adjacent counterbore 72 to lock the tray 64 in the desired vertical position. It will be understood that other shapes of the knob 60 and counterbore 72 may be utilized, instead of the illustrated circular configuration.

Figure 7:
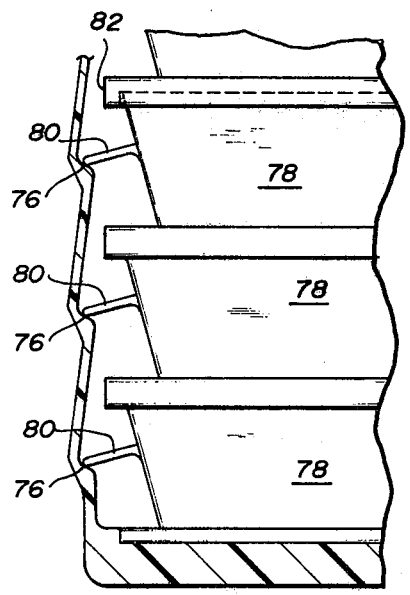
FIG. 7 is a partially broken away side view of a third embodiment of the positioning structure for the invention.

FIG. 7 illustrates another embodiment of the present invention. An outer housing 74 is provided which is generally similar to that shown in FIGS. 1–3, with the exception of vertical steps 76 being formed in the sides thereof. Trays 78 are formed in generally the same manner as the trays previously described, with the addition of flexible fingers 80 which extend from the sides of the trays. Flexible fingers 80 extend into abutment with the steps 76 and are of sufficient strength to support a tray 78 in a desired position. When it is desired to move the tray 78 to a different vertical position, the tray is moved by manual force upward, the flexible finger 80 bends automatically and then springs back into abutment with the next adjacent step 76 in order to retain the tray 78 in the desired position. As shown in FIG. 7, the bottom of each of the trays 78 includes an overhanging flange 82 which protects the underlying tray.

Figure 8:
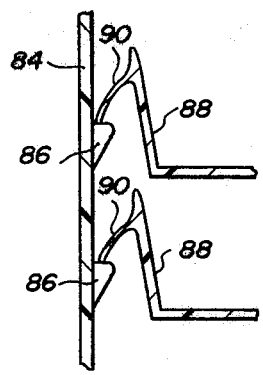
FIG. 8 is a section partially broken away view of a fourth tray embodiment in accordance with the invention.

FIG. 8 illustrates another embodiment somewhat similar to that shown in FIG. 7. The outer rigid housing 84 includes step portions 86 defined along the interior side wall. Trays 88 include flexible fingers 90 which abut with the step portions 86. The flexible fingers 90 have sufficient strength to hold tray 88 in the desired position, but are flexible enough to be bent past step portions 86 when the trays 88 are manually moved upward.

Figure 9:
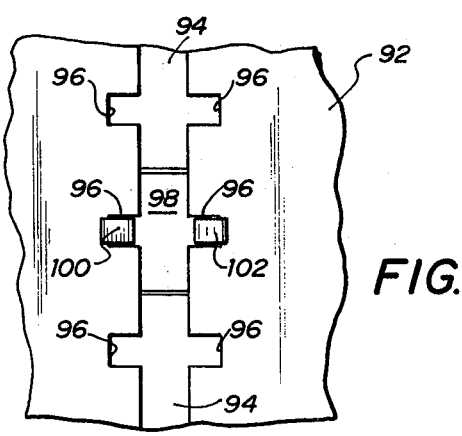
FIG. 9 is a front view of a fifth tray support embodiment in accordance with the invention.
Figure 10:
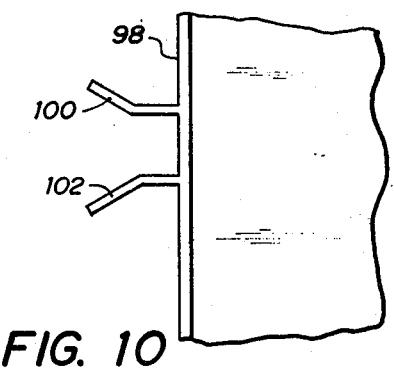
FIG. 10 is a top partially broken away view of a tray fastening device for use with the embodiment shown in FIG. 9.

FIGS. 9 and 10 illustrate yet another embodiment of the present invention. Referring to FIG. 9, a side wall 92 of the outer rigid housing of the invention is illustrated as having a vertical slot 94 formed therein. Horizontal cutouts 96 are formed at spaced intervals along slot 94. A tray 98 includes flexible outwardly extending projections 100 and 102 which may be made from plastic or the like. Projections 100 and 102 are illustrated in FIG. 9 as extending into the cutout portions 96 in order to support the tray 98 in the desired vertical position. When it is desired to move the tray 98 to a different vertical position, the projections 100 and 102 are manually grasped and bent inwardly. The tray is then moved vertically and the projections 100 and 102 are released in order to engage a different set of cutouts 96 to position the tray 98 in the desired position.

It will be understood that other techniques may be utilized to selectively position the tray of the invention within the outer rigid housing. With the use of the present invention, a substantial amount of fishing tackle may be safely stored, and yet may be readily accessible to the fisherman. The present tackle box does not require outwardly folding trays which take up substantial space and which tend to render the box unstable.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. A tackle box comprising:
   a substantially rectangular housing having a bottom wall, a top wall, opposing side walls and a front and back wall,
   a plurality of open topped trays mounted within said housing for solely vertical movement within said housing,
   means on said housing defining a path for vertical movement of said trays,
   said trays having compartments for receiving tackle devices, and
   means for allowing or blocking access to any of said trays by selectively positioning said trays in any of a plurality of vertical positions in said housing.

2. The tackle box of claim 1 wherein said trays have apertures formed in the bottom thereof to allow drainage of fluid.

3. The tackle box of claim 1 wherein said compartments are shaped to receive plastic fishing worms.

4. The tackle box of claim 1 wherein said means for allowing or blocking access to any of said trays comprises:
   knob means on the ends of said trays for cooperating with said side walls of said housing to selectively position said trays in a selected vertical position.

5. The tackle box of claim 4 wherein said knob means comprises:
   knobs threadedly connected to the ends of said trays,
   vertical apertures formed in the side walls of said housing for slidably receiving said knobs, wherein said knobs may be tightened against the side walls of said housing to maintain said trays in a desired position.

6. A tackle box comprising:
   an outer housing,
   a plurality of open topped trays mounted within said housing for vertical movement within said housing,
   said trays having compartments for receiving tackle devices,
   vertical slots formed in the end of said housing,
   counterbores formed at vertical positions along the sides of said slots, and
   knobs attached to the ends of said trays and configured to fit within said counterbores to maintain said trays at selected vertical positions.

7. The tackle box of claim 1 wherein said means for allowing or blocking access to any of said trays comprises:
   flexible members attached to said trays,
   abutment surfaces formed on said housing for supporting said flexible members, wherein when said trays are moved upward vertically said flexible members bend automatically to allow passage past said abutment surfaces.

8. The tackle box of claim 1 wherein said means for allowing or blocking access to any of said trays comprises:
   flexible spring extensions from said trays movable between open and closed positions,
   vertical slots formed in said housing,
   said extensions extending through said vertical slots,
   said extensions gripping said vertical slots when in the open position and allowing vertical movement of said trays when in the closed position.

9. The tackle box of claim 1 wherein said trays include fingers which cover a tray disposed below said flanges.

10. The tackle box of claim 1 wherein the tops of all of said trays are closed when said trays are all moved to their uppermost position within said housing.

11. The tackle box of claim 1 wherein the height of said trays is less than the height of said housing to provide space for vertical movement of said trays.

12. A fishing tackle box comprising:
    a generally rectangular housing having a bottom wall, a top wall, two side walls, a rear wall and a substantially open front wall,
    a plurality of open top horizontal trays mounted within said housing for vertical movement within said housing,
    means on said housing defining a path for vertical movement of said trays,
    said trays having compartments therein for storing fishing tackle,
    means for selectively positioning said trays in said housing, wherein said compartments may be opened for access through said front wall by moving a selected tray to its bottommost position or closed by moving said tray to its uppermost position.

13. The fishing tackle box of claim 12 wherein said compartments are shaped to receive plastic fishing worms.

14. The fishing tackle box of claim 12 wherein said selectively positioning means comprise:
    knobs threadedly connected to the ends of said trays,
    vertical apertures formed in the side walls of said housing for slidably receiving said knobs, wherein said knobs may be tightened against the side walls of said housing to maintain said trays in a desired position.

15. The fishing tackle box of claim 12 wherein said selectively positioning means comprises:
    flexible members attached to said trays,
    abutment surfaces formed on said housing for supporting said flexible members, wherein said trays are moved vertically upward said flexible members bend automatically to allow passage past said abutment surfaces.

16. The fishing tackle box of claim 12 wherein said selectively positioning means comprises:
    flexible spring extensions from said trays movable between open and closed positions,
    vertical slots formed in said housing,
    said extensions extending through said vertical slots,
    said extensions gripping said vertical slots when in the open position and allowing vertical movement of said trays when in the closed position.

17. The fishing tackle box of claim 12 wherein said trays include flanges which cover a tray disposed below said flanges.

18. The fishing tackle box of claim 12 wherein the fishing tackle box is placed in closed condition by moving all of said trays to their uppermost position within said housing.

19. The fishing tackle box of claim 12 wherein the collective height of said trays is less than the height of said housing to provide space for vertical movement of said trays.

20. The fishing tackle box of claim 12 further comprising a substantially open rear wall to allow access to said trays from either said open front or rear wall.

21. The fishing tackle box of claim 12, wherein said means defining a path comprises vertical slots formed in said side walls of said housing and said means for selectively positioning said trays comprises knob means on the ends of said trays for cooperating with said vertical slots along said side walls.

22. The fishing tackle box of claim 21 wherein said means for selectively positioning said trays further comprises:
counterbores formed at selected positions along the sides of said slots, and
said knob means configured to fit within said counterbores to maintain said trays in selected vertical positions.

* * * * *

UNITED STATES PATENT AND TRADEMARK OFFICE
CERTIFICATE OF CORRECTION

PATENT NO. : 4,033,066

DATED : July 5, 1977

INVENTOR(S) : Paul J. Morcom

It is certified that error appears in the above-identified patent and that said Letters Patent are hereby corrected as shown below:

Col. 3, line 41, change "tray" to --trays--.
Col. 5, line 40, change "comprises" to --comprise--.
Col. 6, line 53, after "wherein" add --when--.

Signed and Sealed this

Fourteenth Day of February 1978

[SEAL]

Attest:

RUTH C. MASON
Attesting Officer

LUTRELLE F. PARKER
Acting Commissioner of Patents and Trademarks